(12) United States Patent
Walters et al.

(10) Patent No.: US 11,577,540 B2
(45) Date of Patent: Feb. 14, 2023

(54) FINANCIAL CARD WITH DYNAMIC VIEWING ANGLES TO BLOCK CARD INFORMATION

(71) Applicant: Capital One Services, LLC, McLean, VA (US)

(72) Inventors: Austin Walters, Savoy, IL (US);
Jeremy Goodsitt, Champaign, IL (US);
Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 206 days.

(21) Appl. No.: 16/887,944

(22) Filed: May 29, 2020

(65) Prior Publication Data
US 2021/0375169 A1 Dec. 2, 2021

(51) Int. Cl.
| | |
|---|---|
| B42D 25/00 | (2014.01) |
| B42D 25/29 | (2014.01) |
| B42D 25/36 | (2014.01) |
| G03F 7/00 | (2006.01) |
| G06Q 20/34 | (2012.01) |
| G07F 7/08 | (2006.01) |
| G02B 5/30 | (2006.01) |

(52) U.S. Cl.
CPC ............ B42D 25/00 (2014.10); B42D 25/29 (2014.10); B42D 25/36 (2014.10); G03F 7/0007 (2013.01); G06Q 20/347 (2013.01); G07F 7/0813 (2013.01); *G02B 5/30* (2013.01)

(58) Field of Classification Search
CPC ........ B42D 25/00; B42D 25/29; B42D 25/36; G02B 5/30; G06Q 20/347; G03F 7/0007; G03F 7/0813

USPC .......................................................... 40/124
See application file for complete search history.

(56) References Cited

U.S. PATENT DOCUMENTS

| | | |
|---|---|---|
| 8,035,897 B2 | 10/2011 | Spiro |
| 9,796,204 B2 | 10/2017 | Tompkin et al. |
| 9,834,030 B2 | 12/2017 | Tompkin et al. |
| 10,127,755 B2 | 11/2018 | Holmes |
| 10,279,617 B2 | 5/2019 | Raymond et al. |
| 10,369,832 B2 | 8/2019 | Raymond et al. |
| 10,482,452 B1 | 11/2019 | Benkreira et al. |
| 10,583,681 B2 | 3/2020 | Raymond et al. |
| 2003/0128343 A1 | 7/2003 | Crasnianski et al. |
| 2006/0219776 A1 | 10/2006 | Finn |
| 2011/0073659 A1 | 3/2011 | Lawyer et al. |
| 2012/0268598 A1 | 10/2012 | Holmes et al. |
| 2018/0134065 A1 | 5/2018 | Tompkin et al. |

OTHER PUBLICATIONS

PCT International Application No. PCT/US2021/033955, International Search Report of The International Searching Authority, dated Sep. 10, 2021, 7 pages.
PCT International Application No. PCT/US2021/033955, Written Opinion of The International Searching Authority, dated Sep. 10, 2021, 7 pages.

*Primary Examiner* — Ruiyun Zhang
(74) *Attorney, Agent, or Firm* — DLA Piper LLP US

(57) ABSTRACT

Methods and systems for a financial card with dynamic viewing angles are disclosed. A first portion of indicia and a second portion of indicia can be disposed on a first surface and/or a second surface of a financial card. The first portion of the indicia can be viewable only from at least a first viewing angle. The second portion of the indicia can be viewable only from at least a second viewing angle, the second viewing angle being different from the first viewing angle.

20 Claims, 10 Drawing Sheets

Slide to reveal/conceal numbers based on filer position(s)

FINANCIAL CARD WITH DYNAMIC VIEWING ANGLES TO BLOCK CARD INFORMATION

FIELD OF THE DISCLOSURE

The present disclosure relates to a secure financial card with dynamic viewing angles, and a method of making the same.

BACKGROUND

Currently, there are various means in which consumers may transact with third party vendors. Financial card products such as debit or credit cards are payment apparatuses that are offered and provided to consumers by card providers (e.g., banks and other financial institutions). With a financial card, an authorized customer is capable of purchasing services and/or merchandise without an direct exchange of cash. Contactless payment transactions may be implemented when customers present and use the financial cards with payment devices. Financial card information may be viewable and/or photographable under certain conditions which may lead to fraud and financial loss to customers and card providers.

SUMMARY

In accordance with some embodiments of the present disclosure, there is provided a financial card including a first surface and a second surface opposite the first surface. The financial card may include a first portion of indicia and a second portion of the indicia indicative of the card information, and a slide device. When the slide device is in a first position associated with the first portion of indicia, the slide device may allow the first portion of indicia to be viewable from a first viewing angle. When the slide device is in a second position associated with the second portion of the indicia, the slide device may allow the second portion of the indicia to be viewable from a second viewing angle. The second viewing angle associate with the second portion of the indicia may be different from the first viewing angle associated with the first portion of the indicia.

Furthermore, in accordance with some embodiments of the present disclosure, there is provided a method for manufacturing a financial card. The method may include disposing, on a first surface and/or a second surface of a financial card, a first portion of indicia and a second portion of the indicia. The first portion of the indicia may be configured to be viewable from at least a first viewing angle. The second portion of the indicia may be configured to be viewable from at least a second viewing angle. The second viewing angle associate with the second portion of the indicia may be different from the first viewing angle associated with the first portion of the indicia.

In some embodiments, the method further includes printing the first portion of the indicia and the second portion of the indicia on one of the first surface and the second surface using lithography.

In some embodiments, the method further includes disposing one or more polarization layers on each of the first portion of the indicia and the second portion of the indicia.

In some embodiments, the method further includes applying a slide device to the one or more polarization layers to adjust a respective polarization angle associated with each of the first portion of the indicia and the second portion of the indicia.

Furthermore, in accordance with some embodiments of the present disclosure, there is provided a system including at least two portions of indicia. The at least two portions of the indicia may be disposed on a surface of the financial card using lithographic lenticular printing. The card information may include a first portion of the indicia configured with at least a first viewing angle and a second portion of the indicia configured with at least a second viewing angle. The second viewing angle associate with the second portion of the indicia may be different from the first viewing angle associated with the first portion of the indicia such that the card information cannot be read from one viewing angle.

In some embodiments, the first portion of the indicia may be configured to be viewable from the first viewing angle at a first orientation. The second portion of the indicia may be configured to be viewable from the second viewing angle at a second orientation. The first orientation may be different from the second orientation.

In some embodiments, the first portion of indicia and the second portion of the indicia may be printed on one of the first surface and the second surface using lithography.

In some embodiments, the financial card may include one or more polarization layers disposed on each of the first portion of the indicia and the second portion of the indicia.

In some embodiments, the slide device may be applied to the one or more polarization layers to adjust a respective polarization angle associated with each of the first portion of the indicia and the second portion of the indicia.

In some embodiments, the first portion of the indicia and the second portion of the indicia each may include a respective set of digital numbers associated with a customer account number.

In some embodiments, the financial card may be configured such that the customer account number may be read by rotating the financial card.

In some embodiments, the financial card may be configured such that the customer account number may be unable to be captured by an image of the financial card.

It is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the example embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Embodiments of the present disclosure describe techniques of utilizing dynamic viewing angles associated with financial card information to block financial card numbers thereby preventing financial card fraud.

Embodiments described herein are directed to a financial card and a method of making the financial card with a plurality of portions of the standard indicia indicative card information which may be printed and/or embedded on two surfaces of the financial card. The portions of the indicia may be configured with dynamic viewing angles for blocking card numbers from being read. The portions of the indicia configured with dynamic viewing angles may be printed on card surfaces by utilizing different manufacturing technology including a lenticular process and/or a polarization process to enhance and improve the card viewing quality. Each card portion may be printed on the card surface with a predefined viewing angle in a specific orientation such that the card information may only be read by rotating the financial card with a predefined viewing angle at a particular orientation and/or using a slide, such that the full financial card information may be more difficult to be seen by another user and/or captured by an image of the financial card. Various card portions may include: all or part of a card number (e.g., different groups of numbers (either situated together or separated) having different viewing angles, or each number having a different viewing angle)), an expiration date, or a security code, or any combination thereof. Providing financial cards with dynamic viewing features may prevent fraud card and/or fraudulent activities when customers present their financial cards in public areas because they can be difficult to read and/or they can be difficult to photograph.

As used herein, the term "indicia" may include, but are not limited to, numbers, texts, and any description for describing financial card information printed and/or embedded on financial card surfaces.

Figure 1:
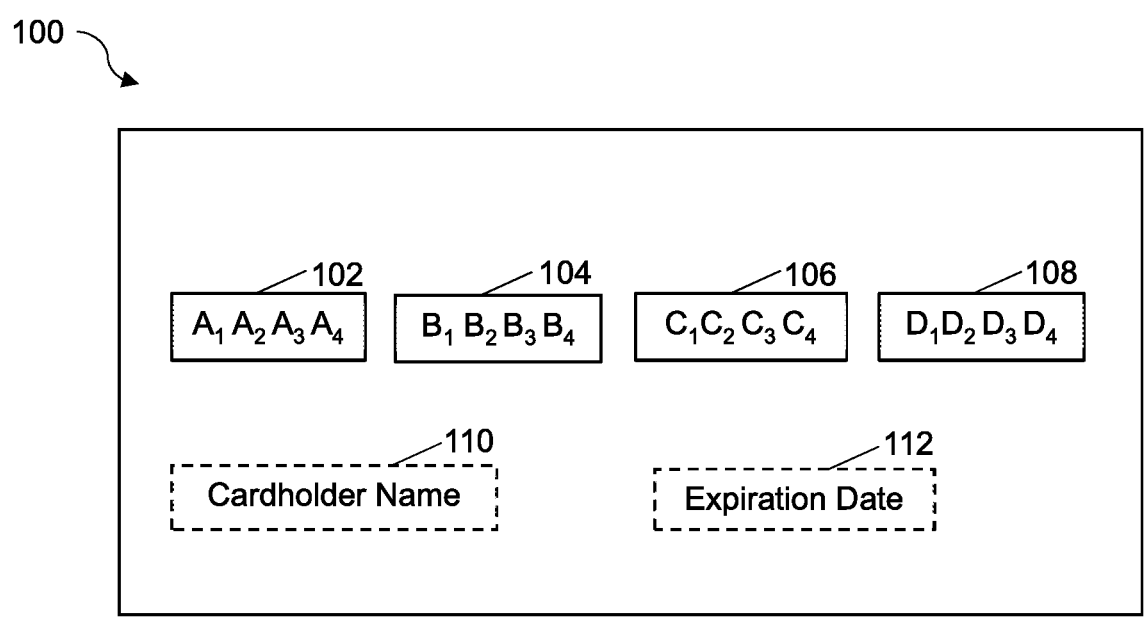
FIG. 1 illustrates an example financial card in accordance with some embodiments of the present disclosure.

FIG. 1 illustrates an example financial card 100 in accordance with some embodiments of the present disclosure. A financial card 100 may have two card surfaces with one surface opposite another surface. The financial card 100 may include a plurality of portions of the standard indicia representing the card information. With reference to FIG. 1, the standard indicia printed and/or embedded on an example financial card 100 may include a portion indicative of a customer name, and multiple portions 102, 104, 106 and 108 indicative of a card number, a portion 110 of indicia indicative of a card member name, a portion 112 indicative of an expiration date, a portion indicative of a card verification value (CVV), and other portions associated with the card information.

The plurality of portions of the standard indicia may be printed on a plastic layer disposed on each card surface. The customer may view each portion of the indicia by rotating the card to a predefined viewing angle at an orientation. The viewing angle of a portion of the indicia may be an angle of the card with reference to a horizontal plane of the card from where portion of the indicia is viewable. The viewing angle associated with each portion of the indicia may be configured to be oriented to various orientations. For example, the viewing angle of the portion of the indicia may be configured to be oriented vertically or horizontally with reference to a horizontal plane of the card. The card may be rotated with respective predefined viewing angles from where the customer may only view one portion of the indicia. The plurality of portions of the indicia indicative of full card information may be viewable and read by rotating the financial card such that the card information is unable to be captured by an image of the financial card.

In some embodiments, the financial card 100 may include a slide device (e.g., slider) attached to a card surface and configured to move to different portions of the indicia for facilitating card reading and adjusting respective polarization angle of the respective portion of the indicia to improve the viewing quality. Details related to the slide device will be described below.

The financial card 100 may be associated with a customer financial account which is registered with a financial card provider and the financial card data may be stored in a database (not shown) possessed by a financial card provider. The customer financial card data may include data of the plurality of portions of the indicia. The financial card 100 may be manufactured with financial card data by utilizing different processes including a lenticular process and/or a polarization process. The customer financial card data associated with each portion of the indicia may include features of lenticular settings and polarization filter settings, and card surface settings. The features of the lenticular settings for each portion of the indicia may include a viewing angle, an orientation, and other related parameters. The financial card 100 may be customized based on customer's preferences. For example, a customer may access a card provider website via a browser of a customer computing device or access a mobile application installed on a customer mobile device to view the card data and request a card with a particular settings based on the customer's preferences.

As illustrated in FIG. 1, a typical financial card 100 may have a unique 16-digit card number associated with a customer and a customer account. The 16-digit card number may include 4 portions of the indicia and each portion of the indicia may include a set of 4 digits. For example, the first portion 102 of 16-digit card number may be indicated as $A_1A_2A_3A_4$. The second portion 104 of 16-digit card number may be indicated as $B_1B_2B_3B_4$. The third portion 106 of 16-digit card number may be indicated as $C_1C_2C_3C_4$. The fourth portion 108 of 16-digit card number may be indicated as $D_1D_2D_3D_4$. Each portion of 16-digit card number may be separated with each other and configured with a predefined viewing angle at an orientation. A secure financial card may be achieved by rotating the card to particular viewing angles at respective orientations such that different portions of the indicia can be viewable and read while the card number is unable to be captured by one view or one image of the financial card. For example, the card may be rotated vertically or horizontally based on the respective predetermined viewing angles and/orientations such that a customer may view the different portions of the indicia sequentially to obtain the full card information.

Figure 2:
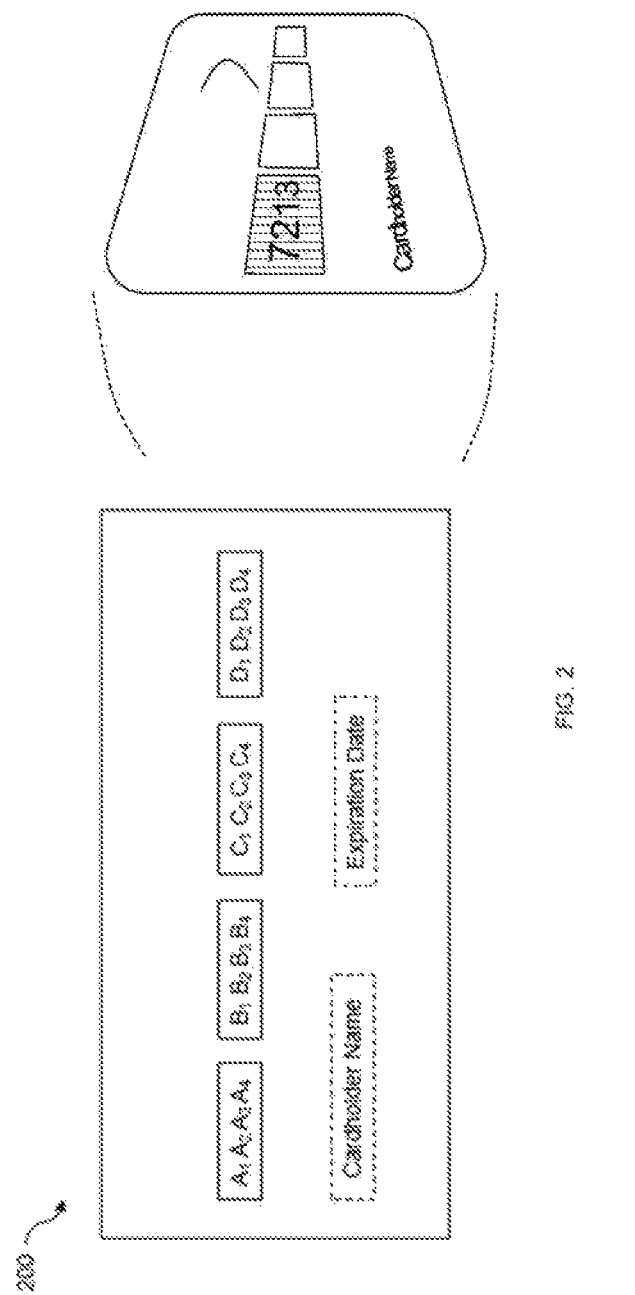
FIG. 2 is a diagram showing an example financial card with a portion of indicia rotated horizontally to be viewable in accordance with some embodiments of the present disclosure.

FIG. 2 is a diagram showing an example financial card with a portion of the indicia rotated horizontally to be viewable by a customer. For example, the customer may only see the first portion of 16-digit card number $A_1A_2A_3A_4$ (e.g., "7213") when the card is rotated horizontally in a predefined viewing angle associated with the first portion of 16-digit card number $A_1A_2A_3A_4$.

Figure 3:
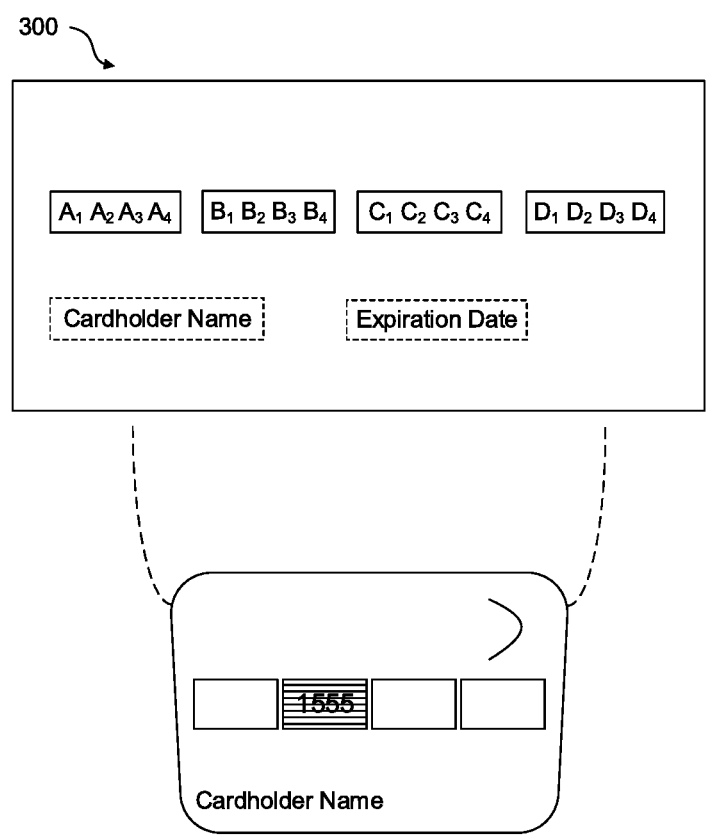
FIG. 3 is a diagram showing an example financial card with a portion of indicia rotated vertically to be viewable in accordance with some embodiments of the present disclosure.

FIG. 3 is a diagram showing an example financial card with a portion of the indicia rotated vertically to be viewable by a customer. For example, a customer may only see the second portion of 16-digit card number $B_1B_2B_3B_4$ (e.g., "1555") when the card is rotated vertically to be viewable in a particular viewing angle associated with the second portion of 16-digit card number $B_1B_2B_3B_4$.

Figure 4:
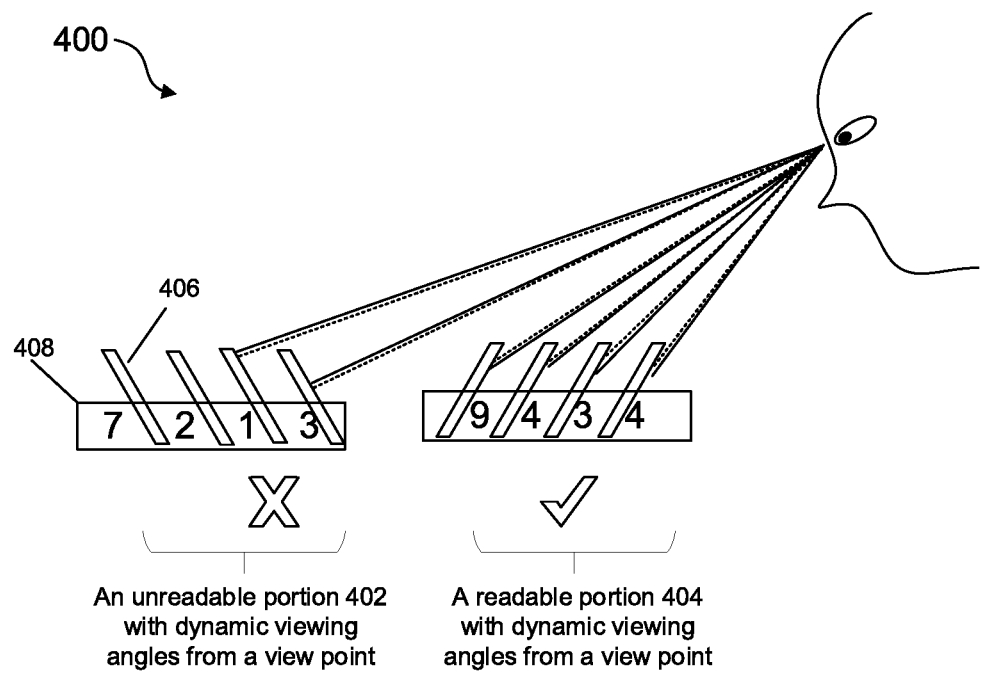
FIG. 4 is a diagram illustrating an example financial card comprising two portions of the indicia each with different dynamic viewing angles in accordance with some embodiments of the present disclosure.

FIG. 4 is a diagram illustrating viewing effects of two example portions of the indicia of an example financial card in accordance with some embodiments of the present disclosure. In some embodiments, each portion of the card number may be printed on a plastic layer of a card surface 408 using lenticular printing. Each portion of the card number may be configured to viewable only with a respective predefined viewing angle. Different portions of the card number may be configured with different viewing angles. For example, a portion 404 ("9434") of the indicia may be configured with a predefined viewing angle such that the portion 404 may be viewable and read by a customer when the card is rotated to a predefined viewing angle while a portion 402 ("7213") of the indicia may not be viewable from the same view point. In some embodiments, different portions of the indicia may be configured with different viewing angles with a particular range of degree differences. A viewing angle may be represented by an angle of a dashed line with respect to the card surface. A 90 degree viewing angle may be a viewing angle for a card to be viewable directly forward. In some embodiments, different portions of the indicia may be configured to have a range of approximately 10 to 15 degrees of viewing angle difference per each portion (e.g., each group of digits, per each digit 406). In some embodiments, the viewing angle may have a range of approximately 45 to 135 degrees in any direction (assuming the 90 degree viewing angle is direct forward). Angle of incidence per digit may vary based on a viewing angle, the thickness, and type of plastic material in the card.

Figure 5:
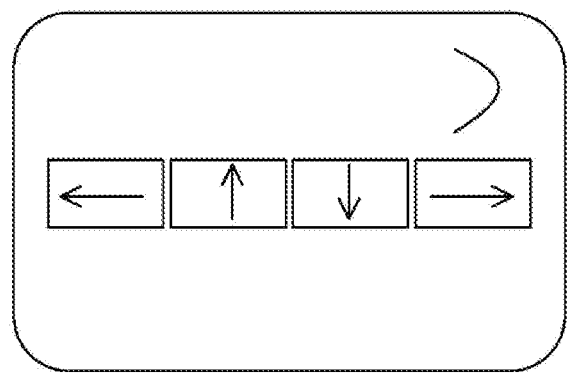
FIG. 5 is a diagram illustrating an example financial card with different portions of indicia rotated to be viewable in multiple viewing angles and different orientations in accordance with some embodiments of the present disclosure.

FIG. 5 is a diagram illustrating an example financial card with different portions of the indicia configured to be viewable at different orientations in accordance with some embodiments of the present disclosure. In some embodiments, the card information may be obtained by rotating the card such that different portions of the indicia may be viewable from respective predefined viewing angles at different orientations. Each portion of the indicia may be printed and/or embedded on the card surface and configured to be viewable with one or more specific viewing angles at a predefined orientation.

In some embodiments, a secure financial card may be manufactured by printing and/or embedding different portions of the indicia on one or two card surfaces by utilizing lithography technology such as lenticular printing. Lenticular printing technology may be utilized to print and/or embed different portions of the indicia on one or two card surfaces such that each portion of the indicia may have a particular viewing angle at a particular orientation. Lenticular printing may be used to print different portions of the indicia with different predefined viewing angles. For example, a portion of the indicia may include digits and/or letters each configured with a viewing angle at an orientation. Lenticular printing may be utilized to print each digit or partial portion of the indicia with a different viewing angle. Lenticular printing may change the direction of each digit or partial portion of the indicia viewable with the different viewing angle. The flip effects of the lenticular printing may be applied to different portions of the indicia such that the full card information may be read by rotating the card such that each portion of the indicia can be viewable from a respective predefined viewing angle at a predetermined orientation.

Figure 6:
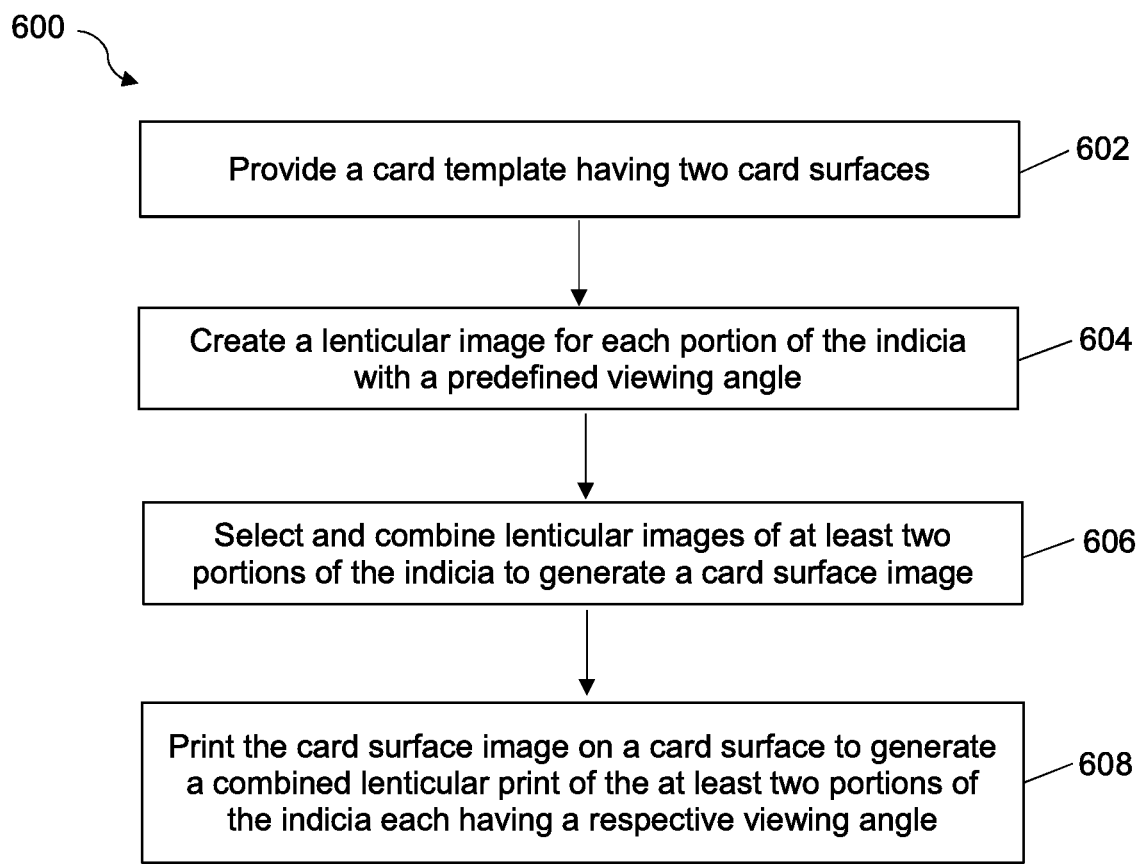
FIG. 6 illustrates an example lenticular process of manufacturing an example financial card in accordance with some embodiments of the present disclosure.

FIG. 6 illustrates an example lenticular process 600 of manufacturing an example financial card with a plurality of portions of indicia configured with different viewing angles in accordance with some embodiments of the present disclosure.

At step 602, a card template may be provided with two card surfaces such as plastic surfaces.

At step 604, a lenticular image may be created for each portion of the indicia such that each portion of the indicia may be configured with a specific predefined viewing angle at an orientation. A plurality of lenticular images may be generated for respective portions of the indicia.

At step 606, at least two portions of the indicia lenticular images associated with respective portion of the indicia may be selected and combined to generate a card surface image (e.g., image file) to be printed on a card surface.

At step 608, a lenticular printing machine may receive and print the generated surface image on one card surface. The lenticular printing machine may print the card surface image on a card surface to generate a combined lenticular print of the at least two portions of the indicia each having a respective predefined viewing angle at a specific orientation.

In some embodiments, the generated lenticular print may provide viewing effects which enable a customer to view each portion of the indicia by turning the card to a predefined viewing angle along a corresponding orientation. A viewer or customer may rotate the card surface with different viewing angles in a particular orientation to be able to see the full card information.

In some embodiments, a secure financial card may be made by configuring different portions of the indicia with a customized combination of lenticular lens having different viewing angles and different orientations. Each portion of the indicia may be predefined with a particular viewing angle at an orientation.

For example, at least two different portions of the indicia of a card may be configured with different viewing angles and/orientated to a same direction to allow the customer to view the card information in one rotation orientation. As illustrated in FIG. 2, different portions of 16-digit card number may be configured to be viewable from different viewing angles when the card is rotated horizontally (e.g., left-to-right) in a sequence. As illustrated in FIG. 3, different portions of 16-digit card number may be configured to be viewable from different viewing angles when the card is rotated vertically (e.g., up and down) in a sequence.

In some embodiments, at least two different portions of the indicia of a card may be configured with the same viewing angle and each portion of the indicia may be orientated to a different direction to allow the customer to view the card information. For example, as illustrated in FIG. 5, 4 portions of the 16-digit card number may be configured to be oriented to 4 different directions. In one embodiment, each portion of the card number may be configured with different viewing angles and oriented to 4 different directions. In one embodiment, some portions of the 16-digit card number may have the same viewing angle and other portions may have different viewing angles. In one embodiment, some portions of the 16-digit card number may be configured to orient to the same direction and other portions may be configured to orient to different directions.

In some embodiments, there may be a number of different viewing angles arranged in an order and predefined for different groups of portions of the indicia. In some embodiments, all or part of a card number (e.g., different groups of numbers (either situated together or separated) may have different viewing angles. In one embodiment, each number may have a different viewing angle. For example, four portions of 4 numbers each can be used; or each digit of 16 digits in a card can each have their own viewing angle. Different portions of card numbers may be configured with different viewing angles with a particular range of degree difference. For example, different portions of the indicia may be configured to include a range of 10 to 15 viewing angles of difference. Different viewing angles may have the same or different rotation orientations to be viewable.

Depending on positions of portions of the indicia printed and/or embedded on a card surface, a polarization process may be applied to the process of manufacturing a secure financial card. When the light encounters a boundary between two media with different refractive indices, partial light is usually reflected. The fraction that is reflected is dependent upon the incoming light's polarization and the polarization angle. A polarization angle is an angle of incidence at which light with a particular polarization can be transmitted through a transparent dielectric surface with no reflection. The polarization process may apply filter technologies to lenticular lens generated by the lenticular printing on each portion of the indicia. The polarization processing may be applied to improve the card viewing quality when a portion of the indicia is rotated to a viewing angle to be viewable at an orientation.

Figure 7:
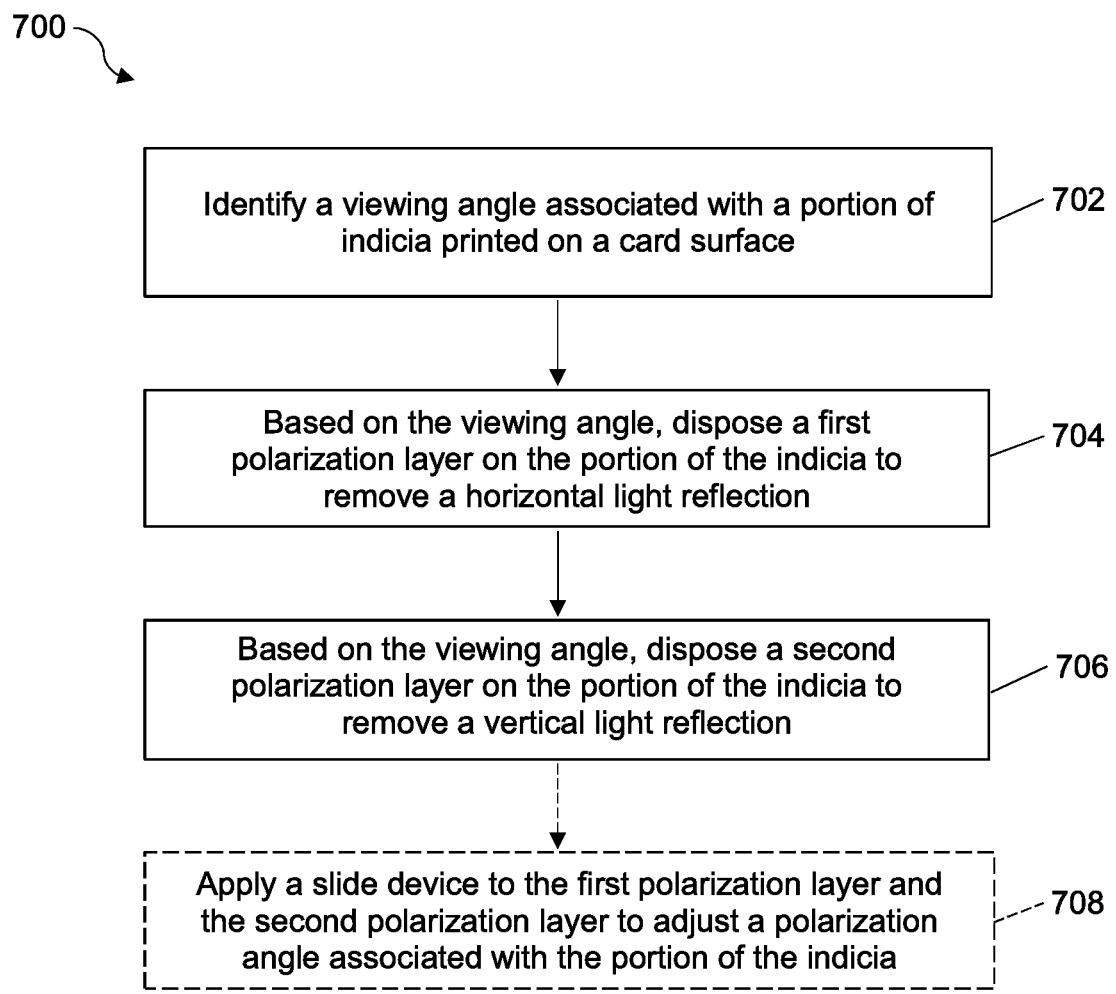
FIG. 7 illustrates an example of manufacturing an example portion of the indicia in accordance with some embodiments of the present disclosure.

FIG. 7 illustrates an example process of manufacturing a portion of the indicia of an example financial card in accordance with some embodiments of the present disclosure.

At step 702, a predefined viewing angle may be identified to be associated with a portion of indicia printed on a card surface.

At step 704, based on the predefined viewing angle of the printed portion of the indicia, a first polarization layer or a first filter may be disposed on and applied to the printed portion of the indicia to block the light from a horizontal direction for removing a horizontal light reflection.

At step 706, based on the predefined viewing angle of the printed portion of the indicia, a second polarization layer or a second filter may be disposed on and applied to the printed portion of the indicia to block the light from a vertical direction for removing a vertical light reflection.

The first filter and the second filter may be configured to adjust a polarization angle of a printed portion of the indicia when the printed portion of the indicia is viewable from a corresponding viewing angle. The first filter and the second filter may be aligned to show a portion of the indicia when the card is rotated to a predefined viewing angle associated to the portion of the indicia. In some embodiments, a filter with a polarization layer may be disposed on a partial portion of the indicia on the card surfaces. For example, a first polarization filter may be applied to the digits $A_1A_2$ of the card number and a second filter polarization filter may be applied to the digits $A_3A_4$ of the card number.

Step 708 may be an optional operation for manufacturing a security card. At step 708, a slide device may be applied to the first polarization layer and the second polarization layer to adjust a polarization angle associated with the portion of the indicia when the light reflected from the printed portion of the indicia and the plastic layer of the card surface. The polarization angle may be adjusted to improve the viewing quality by moving the slider to a portion of the indicia on the card based on the corresponding predefined viewing angle.

Figure 8:
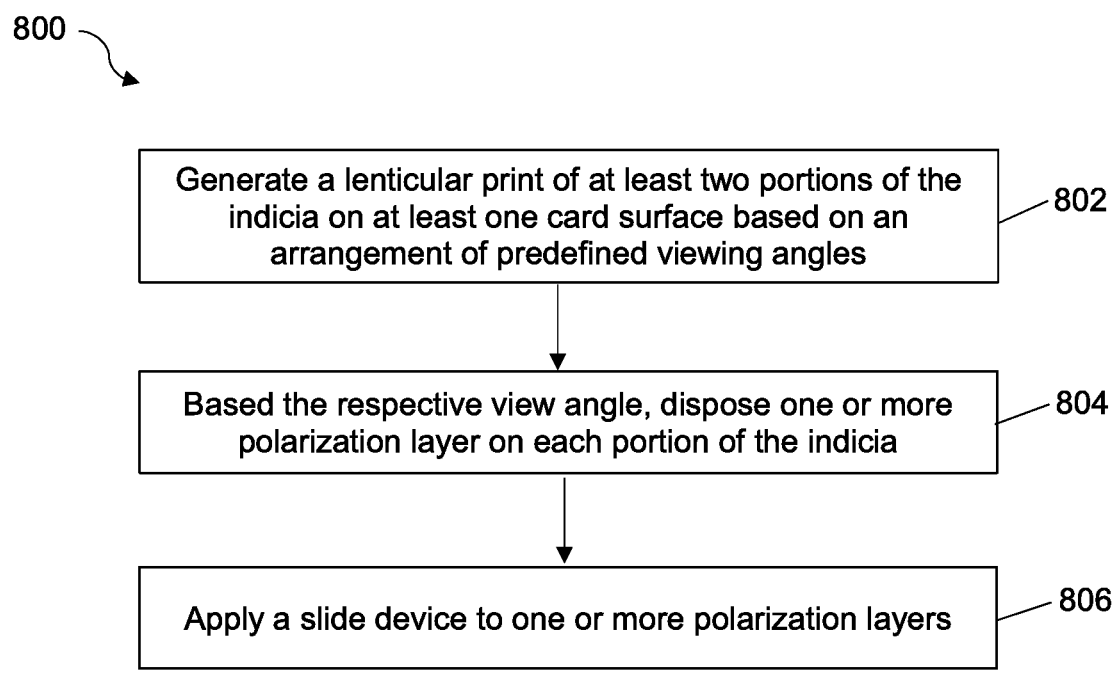
FIG. 8 illustrates an example process of manufacturing an example financial card in accordance with some embodiments of the present disclosure.

FIG. 8 illustrates an example process 800 of manufacturing an example financial card in accordance with some embodiments of the present disclosure.

At step 802, at least two portions of the indicia may be configured to have a combination of predefined viewing angles at the same orientation or different orientations. A lenticular print of the at least two portions of the indicia may be generated on at least one card surface by a lenticular printing machine. In some embodiments, lenticular images may be created to include all portions of the indicia to be printed on both card surfaces. The features associated with each portion of the indicia may include viewing angle, orientation, and polarization settings, and other printing parameters. The features of each portion of the indicia may be customized individually.

At step 804, one or more polarization layers (e.g., polarization filter) may be disposed on each portion of the indicia viewable from a corresponding viewing angle according to operations of 704 and 706 of the process 700 described above.

At step 806, a slider or a slide device may be applied to one or more polarization layers to facilitate a customer to view the card information securely. In some embodiment, the portion of the indicia may be viewable when the card is rotated to a predetermined viewing angle while the slide device moves to a position to reveal the portion of the indicia. Otherwise, the portion of the indicia may be blocked to be read or viewable when the viewing angle does not match the predefined viewing angle and/or the slide device is not in the position to allow the portion of the indicia to be viewable.

In one embodiment, a slide device may be a movable transparent device to facilitate reading the card information. In one embodiment, a slide device may be applied to one or more polarization layers such that each portion of the indicia can be clearly viewable from the corresponding viewing angle. The slide device may be configured to adjust and correct respective polarization angle to improve the card information viewing effects. For example, the slide device may be controlled by the customer to move to a position to align the polarization filters disposed on the portion of the indicia for revealing a portion of the printed card number while preventing reflections from the material of each portion of the indicia and the card surface.

The slide device may be implemented with various structures and configured to be movable and aligned with the polarization filters disposed on the portion of the indicia for revealing the portion of the indicia. Based on the predefined viewing angle, the financial card may be rotated for one portion of the indicia to be read and viewable while other portions of the indicia are not viewable, thereby blocking the card number from being viewed and further preventing fraud card and/or fraudulent activities when the customer present the financial card in public.

For example, after the slide device moves to a first position to align the polarization filters disposed on the portion of the indicia to reveal a portion of the printed card number, if the financial card is rotated to a first predefined viewing angle, the slide device may pass only light polarized at the orientation perpendicular to the reflected light. The slide device may allow the first portion of indicia to be viewable from a first viewing angle. Similarly, after the slide device moves to a second position to align the polarization filters disposed on the second portion of the indicia to reveal a second portion of the printed card number, if the financial card is rotated to a second predefined viewing angle, the slide device may allow the second portion of the indicia to be viewable from a second predefined viewing angle. The second viewing angle and the first viewing angle may be configured to be different within a range of a 10 to 15 degree difference. The first viewing angle and the second viewing angle may be configured to be at the same orientation or different orientations.

Figure 9:
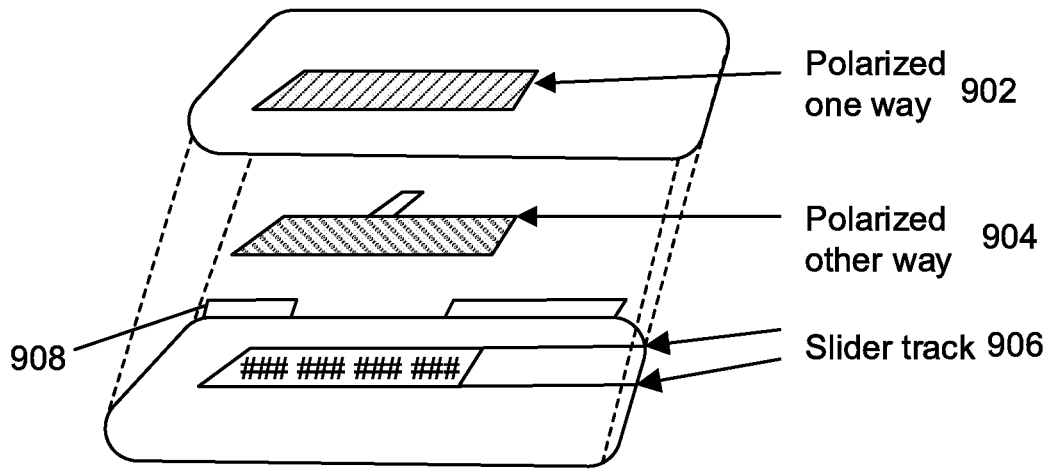
FIG. 9 illustrates an example of applying two polarization layers to a portion of the indicia in accordance with some embodiments of the present disclosure.

In one embodiment, as illustrated in FIG. 9, two different polarization layers may be disposed on a printed portion of the indicia. Based on the predefined viewing angle of the printed portion of the indicia, a first polarization layer 904 may be disposed on and applied to the printed portion of the indicia to block the light from a horizontal direction for removing a horizontal light reflection. A second polarization layer 902 may be disposed on and applied to the printed portion of the indicia to block the light from a vertical direction for removing a vertical light reflection. The first polarization layer 904 and the second polarization layer 902 may be aligned to a slider 908 movable to show a portion of the indicia when the financial card is rotated to a predefined viewing angle associated to the portion of the indicia. A slider track 906 may be embedded to be parallel to the printed portions of the indicia on a card surface. The slider track 906 may be coupled to a movable slider 908 located on a long side of the financial card to facilitate the customer to read the printed portion of the indicia.

Figure 10:
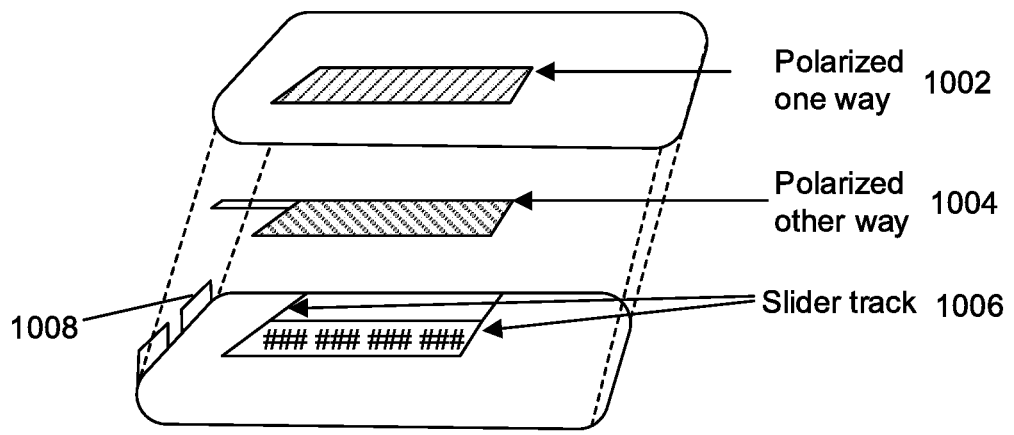
FIG. 10 illustrates another example of applying two polarization layers to a portion of the indicia in accordance with some embodiments of the present disclosure.

In one embodiment, as illustrated in FIG. 10, based on the predefined viewing angle of the printed portion of the indicia, a first polarization layer 1004 may be disposed on and applied to the printed portion of the indicia to block the light from a different direction for removing a horizontal light reflection. A second polarization layer 1002 may be disposed on and applied to the printed portion of the indicia to block the light from a vertical direction for removing a vertical light reflection. In some embodiments, the first polarization layer and the second polarization layer may be aligned to a movable slider 1008 to show a portion of the indicia when the card is rotated to a predefined viewing angle associated to the portion of the indicia. A slider track 1006 may be embedded to be parallel to the printed portions of the indicia on a card surface. The slider track 1006 may be coupled to a movable slider 1008 located on a short side of the financial card to facilitate the customer to read the printed portion of the indicia.

Figure 11A:
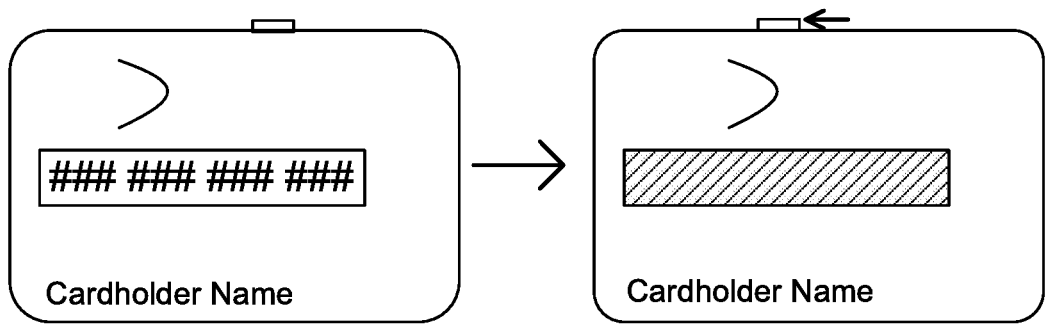
FIG. 11A illustrates an example slide device in accordance with some embodiments of the present disclosure.
Figure 11B:
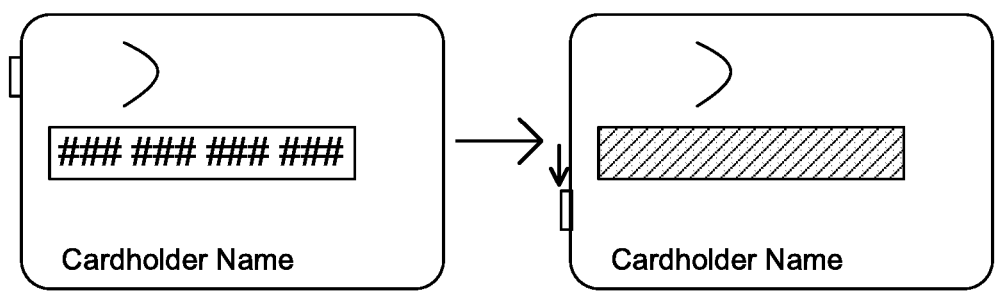
FIG. 11B illustrates another example slide device to reveal portions of the indicia in accordance with some embodiments of the present disclosure.

FIG. 11A illustrates an example slide device in accordance with some embodiments of the present disclosure. As illustrated in FIGS. 9-10, a slider device may be applied to one or more polarization layers disposed on respective printed portions of the indicia. As shown in FIG. 11A, an example slide device may be controlled by moving a button along a long side of a financial card to reveal the printed portions of the indicia. FIG. 11B illustrates another example slide device in accordance with some embodiments of the present disclosure. As shown in FIG. 11B, an example slide device may be controlled by moving a button along a short side of a financial card to reveal the printed portions of the indicia.

Figure 12:
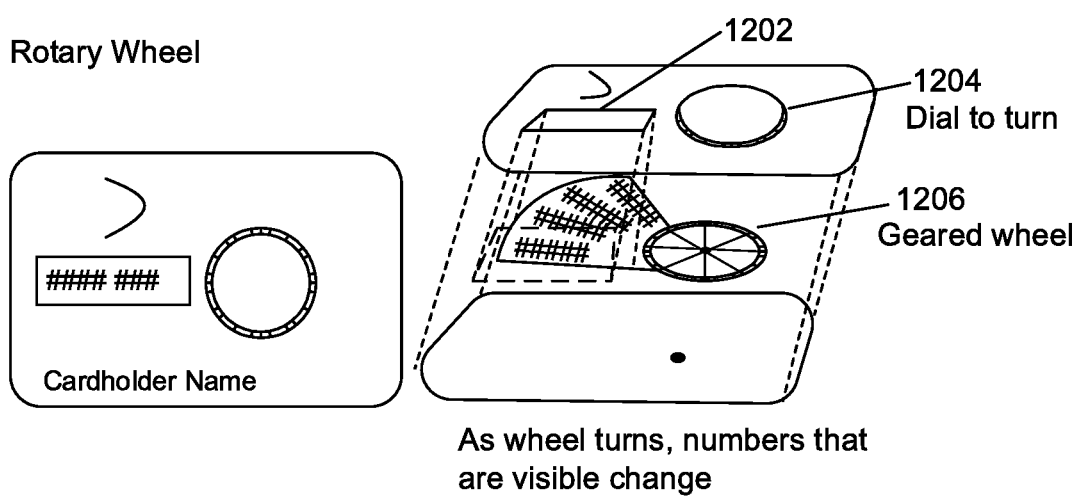
FIG. 12 illustrates an example rotary wheel utilized to reveal portions of the indicia in accordance with some embodiments of the present disclosure.

FIG. 12 illustrates an example rotary wheel utilized to reveal portions of card information in accordance with some embodiments of the present disclosure. An example rotary wheel 1204 may be a geared wheel 1206 disposed on the financial card and configured to turn to different positions to reveal different portions of the indicia. The rotary wheel 1204 may be turned to reveal respective portions of the indicia through a window 1202.

Figure 13A:
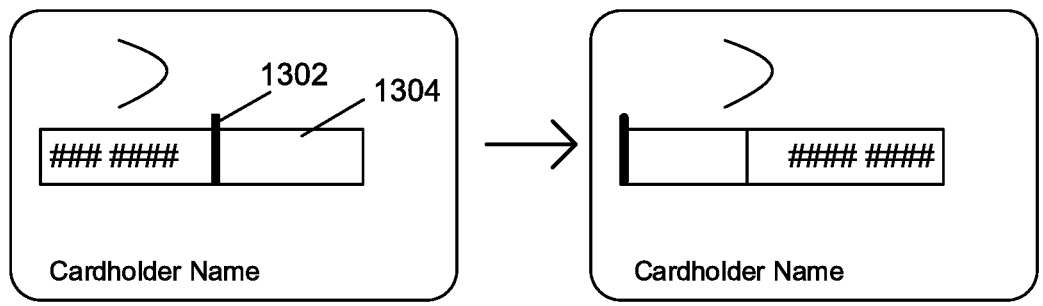
FIGS. 13A-13B illustrates an example slide device utilized to reveal portions of the indicia in accordance with some embodiments of the present disclosure.
Figure 13B:
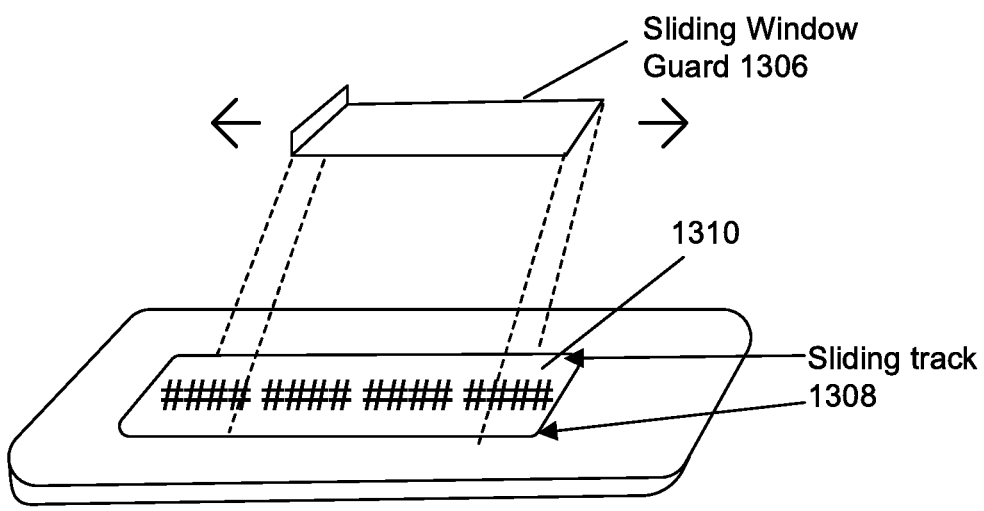

FIGS. 13A-13B illustrates an example slide device utilized to reveal portions 1310 of the indicia in accordance with some embodiments of the present disclosure. The example slide device may include a slider open 1304, a sliding window guard 1306, and a slider track 1308. The sliding window guard 1306 (which may include a piece 1302) may be coupled to the slider track 1308. The slider open 1304 may be configured to move over the window guard to reveal the printed portions 1310 of the indicia.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A financial card, comprising:
   a first surface and a second surface opposite the first surface;
   a first portion of indicia and a second portion of the indicia; and
   a slide device,
   wherein when the slide device is in a first position, the slide device allows the first portion of indicia to be viewable only from a first viewing angle, and wherein when the slide device is in a second position, the slide device allows the second portion of the indicia to be viewable only from a second viewing angle, the second viewing angle being different from the first viewing angle.

2. The financial card of claim 1, wherein the first portion of the indicia is configured to be viewable from the first viewing angle at a first orientation, the second portion of the indicia is configured to be viewable from the second viewing angle at a second orientation, and the first orientation is different from the second orientation.

3. The financial card of claim 1, wherein the first portion of indicia and the second portion of the indicia are printed on one of the first surface and the second surface using lithography.

4. The financial card of claim 1, wherein the financial card further comprises one or more polarization layers disposed on each of the first portion of the indicia and the second portion of the indicia.

5. The financial card of claim 4, wherein the slide device is applied to the one or more polarization layers to adjust a respective polarization angle associated with each of the first portion of the indicia and the second portion of the indicia.

6. The financial card of claim 1, wherein the first portion of the indicia and the second portion of the indicia each comprise a respective set of digital numbers associated with a customer account number.

7. The financial card of claim 6, wherein the financial card is configured such that the customer account number is read by rotating the financial card.

8. The financial card of claim 6, wherein the financial card is configured such that the customer account number is unable to be captured by an image of the financial card.

9. A method, comprising:
   disposing, on a first surface and/or a second surface of a financial card, a first portion of indicia and a second portion of the indicia;
   configuring the first portion of the indicia viewable only from at least a first viewing angle; and
   configuring the second portion of the indicia viewable only from at least a second viewing angle, the second viewing angle being different from the first viewing angle.

10. The method of claim 9, wherein the first portion of the indicia is viewable from at least the first viewing angle at a first orientation, and wherein the second portion of the indicia is viewable from at least the second viewing angle at a second orientation, the first orientation being different from the second orientation.

11. The method of claim 9, further comprising:
    printing the first portion of the indicia and the second portion of the indicia on one of the first surface and the second surface using lithography.

12. The method of claim 9, further comprising:
    disposing one or more polarization layers on each of the first portion of the indicia and the second portion of the indicia.

13. The method of claim 9, further comprising:
    applying a slide device to the one or more polarization layers to adjust a respective polarization angle associated with each of the first portion of the indicia and the second portion of the indicia.

14. The method of claim 9, wherein the first portion of the indicia and the second portion of the indicia each comprise a respective set of digital numbers associated with a customer account number.

15. The method of claim 14, wherein the financial card is configured such that the customer account number is read by rotating the financial card.

16. The method of claim 14, wherein the financial card is configured such that the customer account number is unable to be captured by an image of the financial card.

17. A financial card, comprising:
    at least two portions of indicia disposed on a surface of the financial card using lithographic lenticular printing, the card information comprising the first portion of the indicia configured with at least a first viewing angle and the second portion of the indicia configured with at least a second viewing angle, wherein the second viewing angle is different from the first viewing angle, such that the card information can be read from only one viewing angle of the at least a first viewing angle and the at least a second viewing angle.

18. The financial card of claim 17, wherein the first portion of the indicia is viewable from only at least the first viewing angle at a first orientation, the second portion of the indicia is viewable from only at least the second viewing angle at a second orientation, and the first orientation is different from the second orientation.

19. The financial card of claim 17, wherein the financial card further comprises one or more polarization layers disposed on each of the first portion of the indicia and the second portion of the indicia.

20. The financial card of claim 19, wherein the first portion of the indicia and the second portion of the indicia each comprise a respective set of digital numbers associated with a customer account number, and wherein the financial card is configured such that the customer account number is read by rotating the financial card and the customer account number is unable to be captured by an image of the financial card.

* * * * *